I. KOECHLIN.
MOTOR ROAD VEHICLE FOR SEARCH LIGHT AND THE LIKE OPERATIONS.
APPLICATION FILED APR. 30, 1914.
1,175,063.
Patented Mar. 14, 1916.
7 SHEETS—SHEET 4.
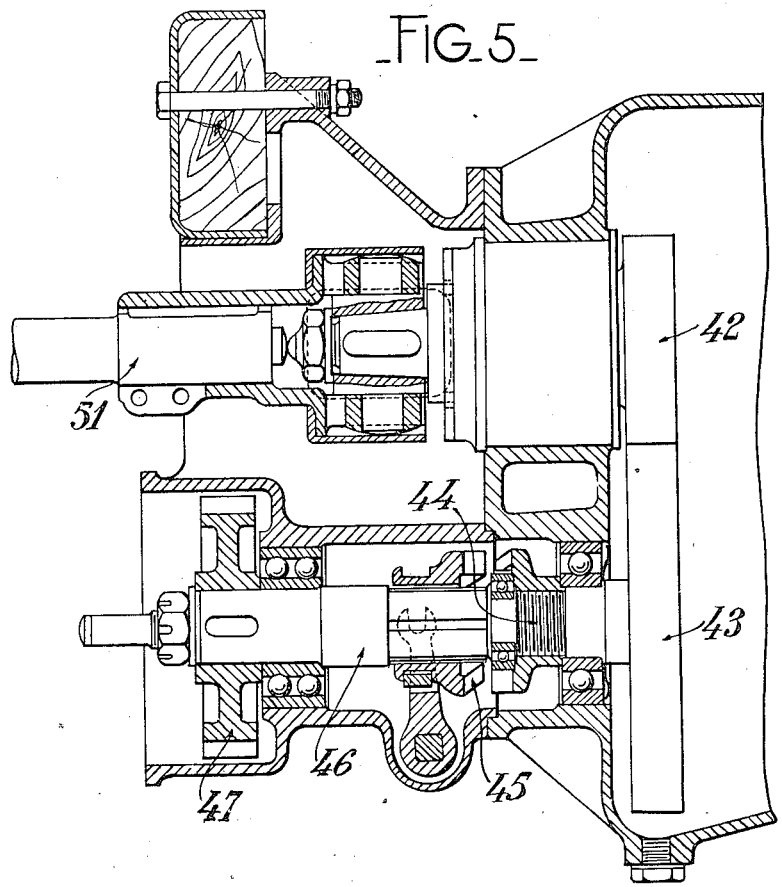
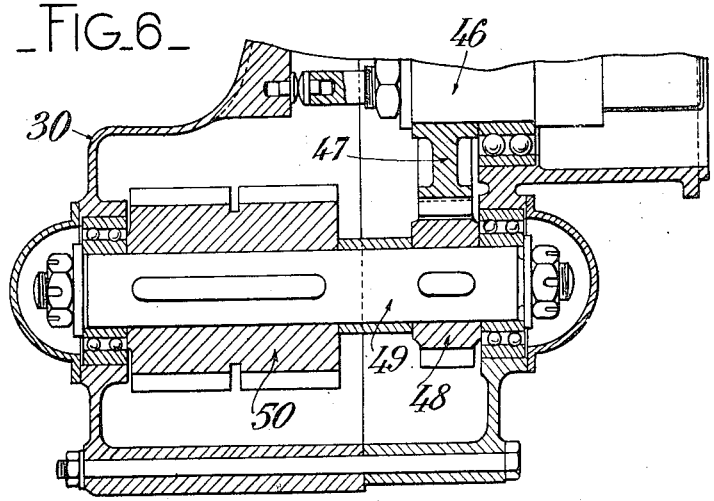
WITNESSES:
John C. Sanders
Albert F. Henman
INVENTOR:
Isaac Koechlin
BY
Wm Wallace White
ATTY I. KOECHLIN.
MOTOR ROAD VEHICLE FOR SEARCH LIGHT AND THE LIKE OPERATIONS.
APPLICATION FILED APR. 30, 1914.

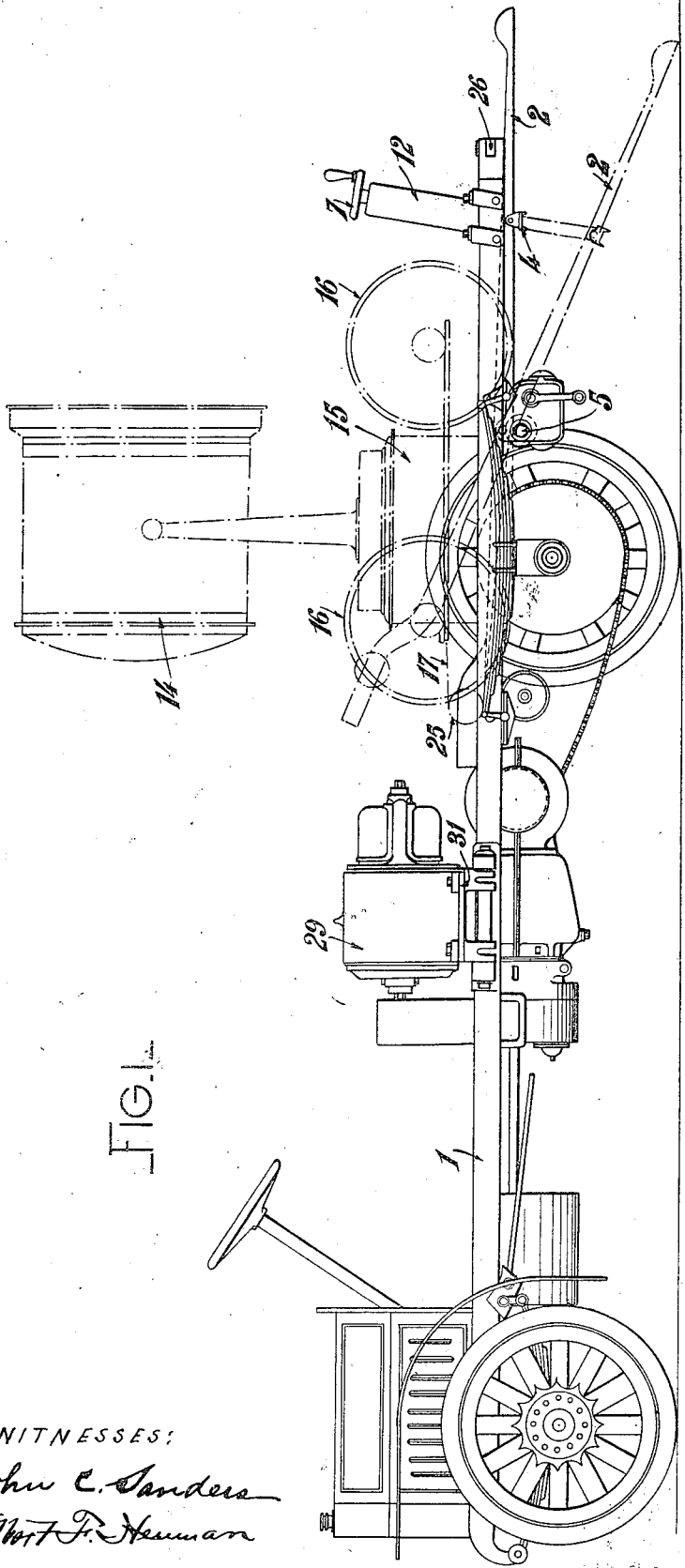

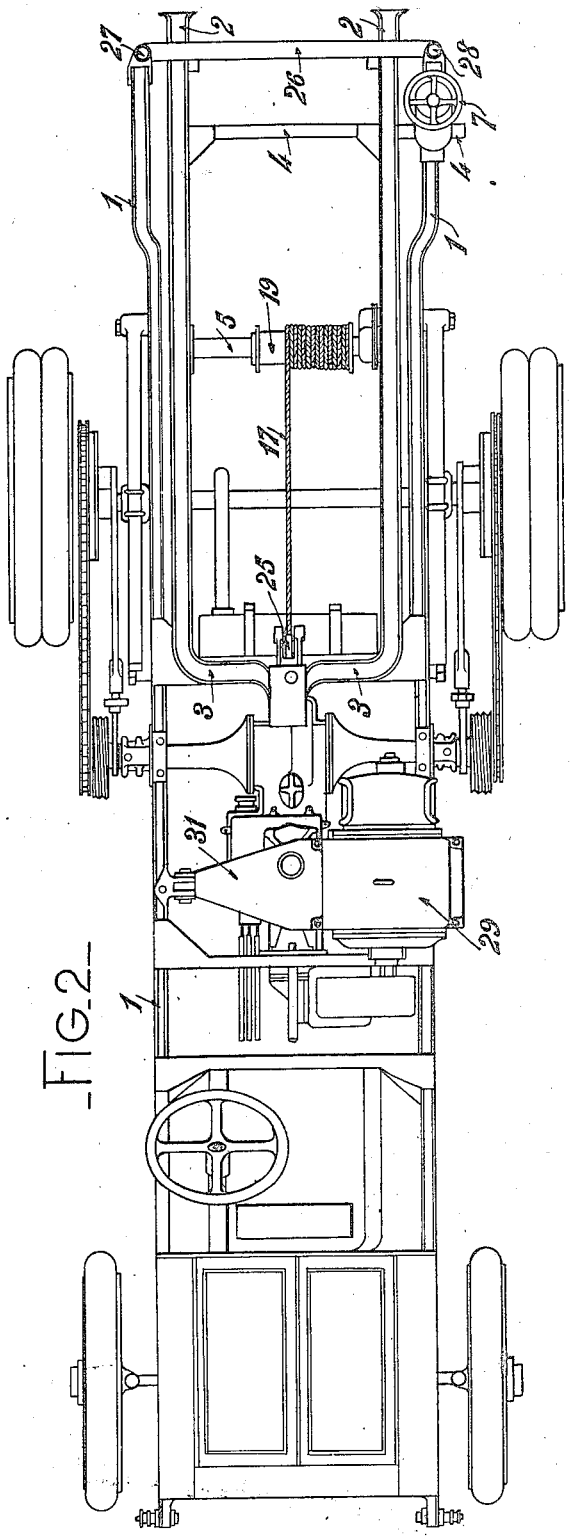

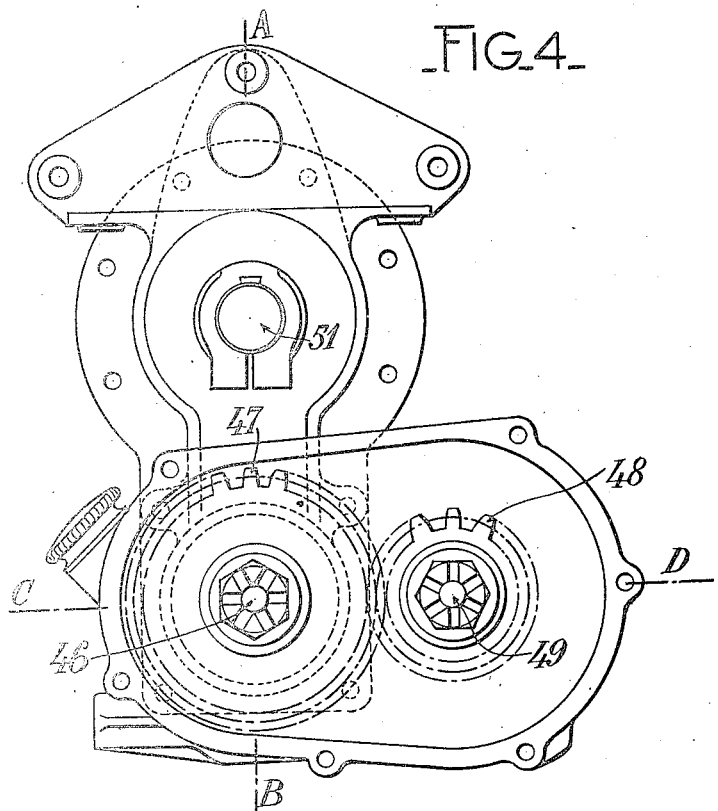
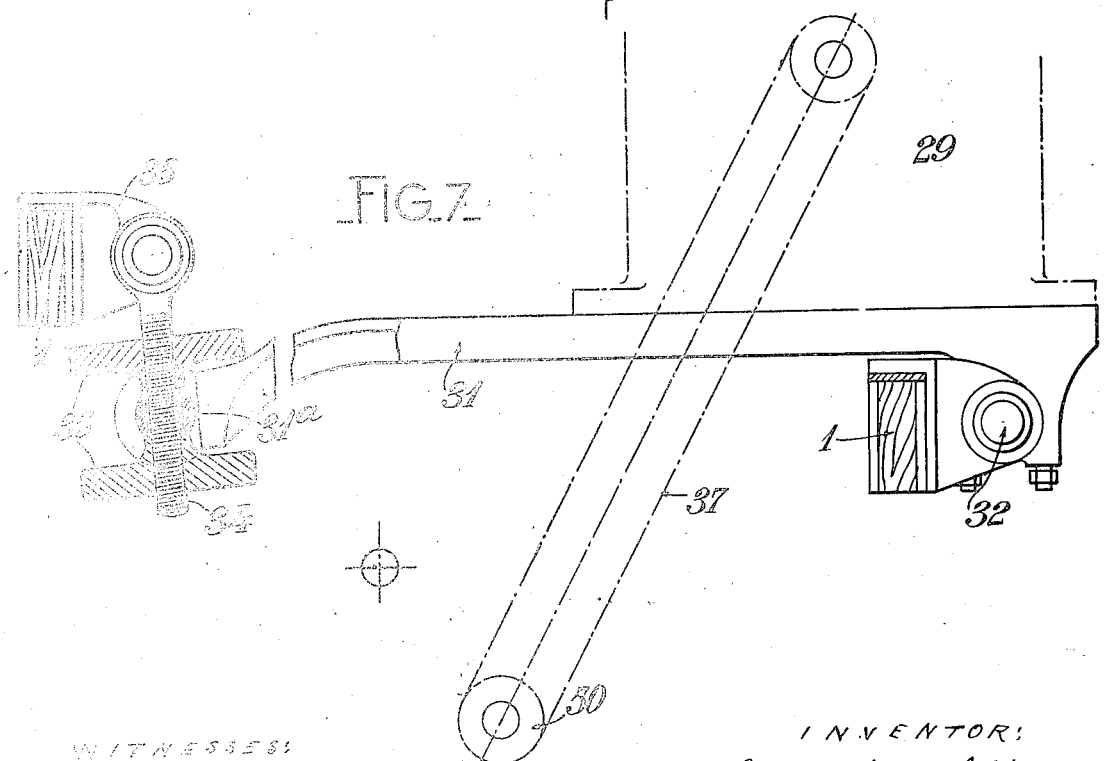

1,175,063.

Patented Mar. 14, 1916.
7 SHEETS—SHEET 5.

WITNESSES:
John C. Sanders
Albert F. Heyman

INVENTOR:
Isaac Koechlin
BY Wallace White
ATT'Y

I. KOECHLIN.
MOTOR ROAD VEHICLE FOR SEARCH LIGHT AND THE LIKE OPERATIONS.
APPLICATION FILED APR. 30, 1914.
1,175,063.
Patented Mar. 14, 1916.
7 SHEETS—SHEET 6.
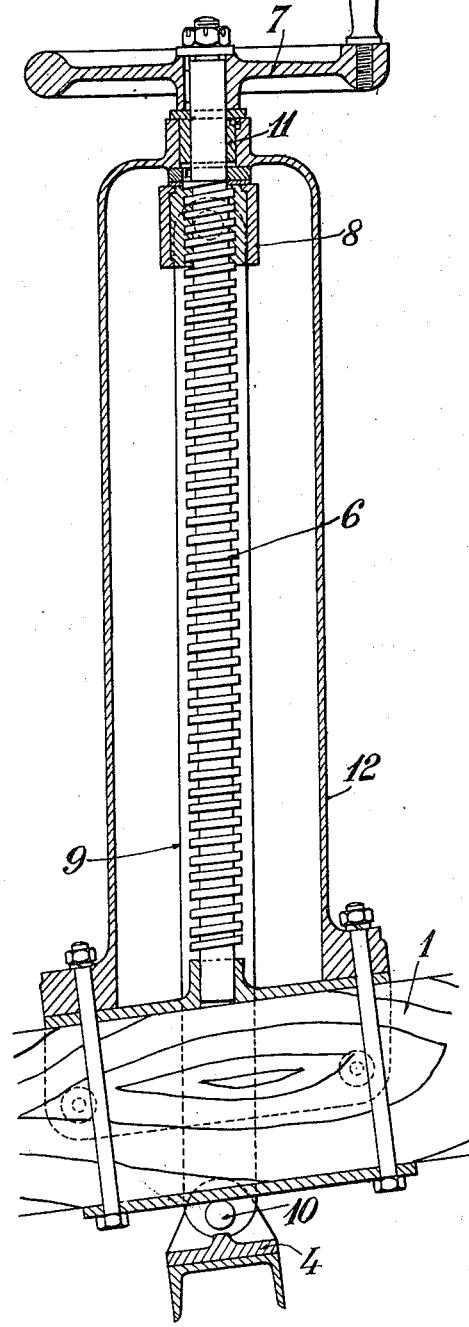
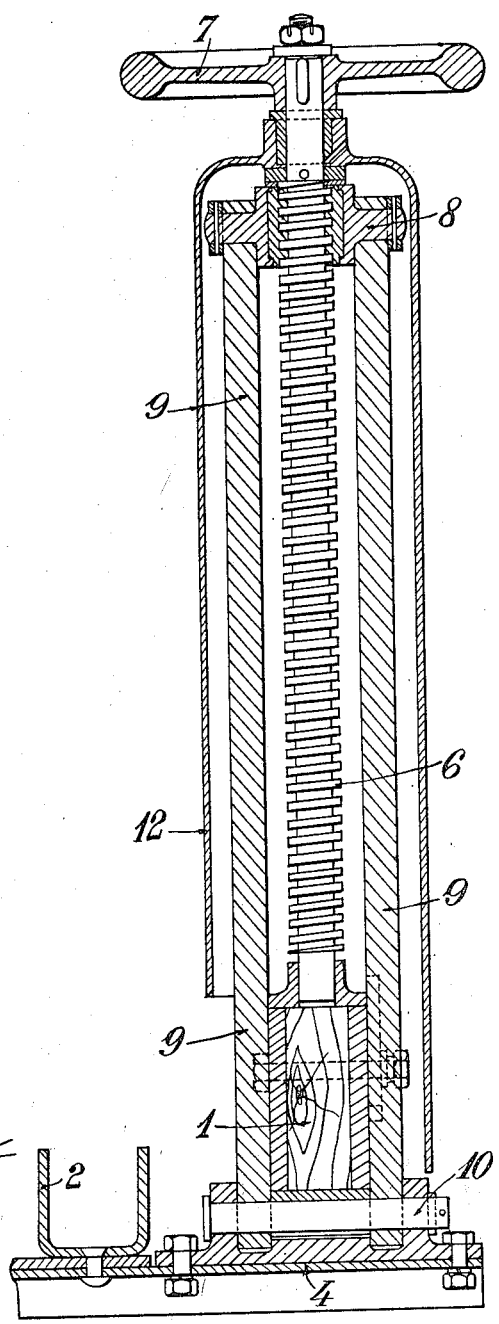

I. KOECHLIN.
MOTOR ROAD VEHICLE FOR SEARCH LIGHT AND THE LIKE OPERATIONS.
APPLICATION FILED APR. 30, 1914.
1,175,063.
Patented Mar. 14, 1916.
7 SHEETS—SHEET 7.
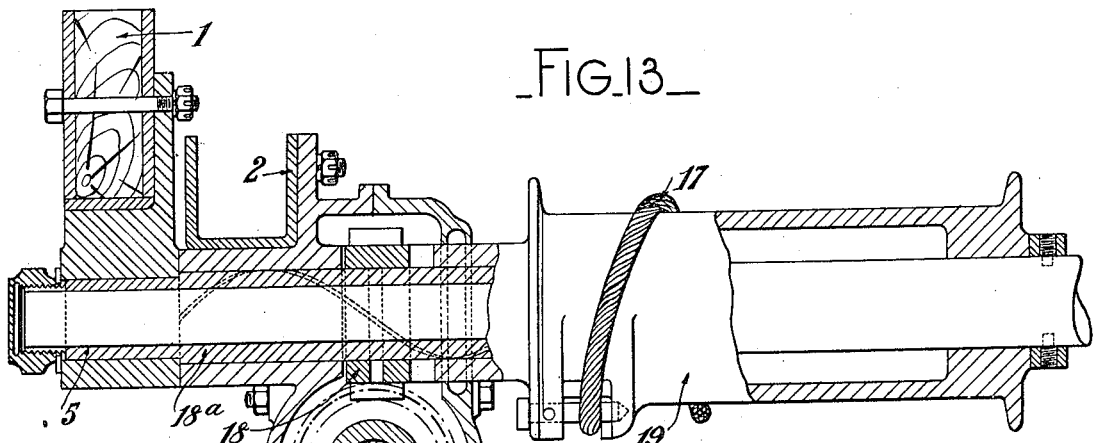
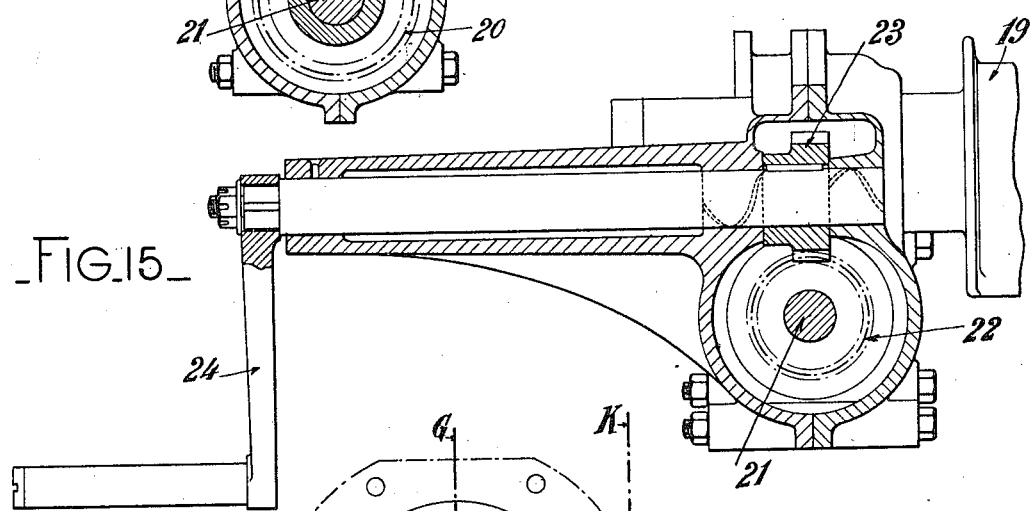
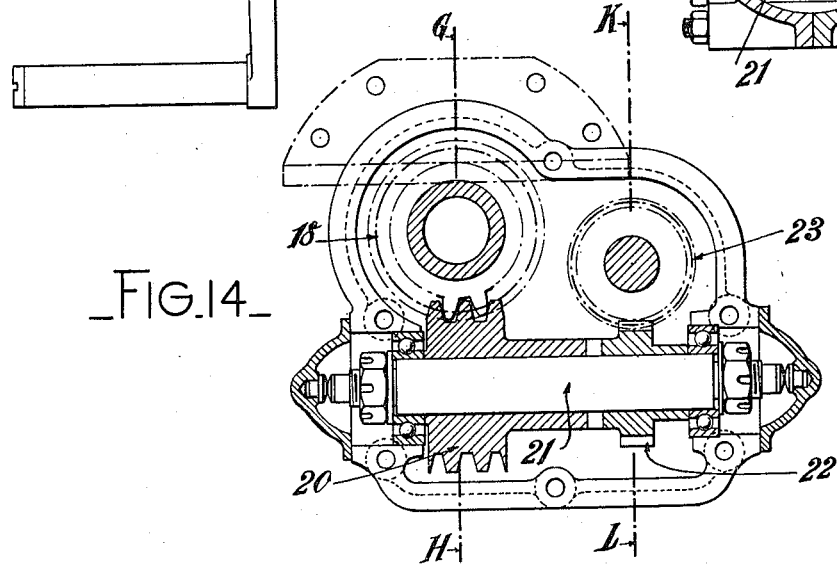
WITNESSES:
John C. Sanders
Albert F. Heusman
INVENTOR:
Isaac Koechlin
BY Wallace White
ATTY

UNITED STATES PATENT OFFICE.

ISAAC KOECHLIN, OF LEVALLOIS-PERRET, FRANCE, ASSIGNOR TO SOCIETE ANONYME DES AUTOMOBILES ET CYCLES PEUGEOT, OF PARIS, FRANCE.

MOTOR ROAD-VEHICLE FOR SEARCH-LIGHT AND THE LIKE OPERATIONS.

1,175,063.  Specification of Letters Patent.  Patented Mar. 14, 1916.

Application filed April 30, 1914. Serial No. 835,413.

*To all whom it may concern:*

Be it known that I, ISAAC KOECHLIN, citizen of Switzerland, residing at 71 Rue Danton, Levallois-Perret, Seine, in the Republic of France, have invented new and useful Improvements in Motor Road-Vehicles for Search-Light and the like Operations, of which the following is a specification.

This invention relates to an improved motor road vehicle for search-light and the like operations and has for its object a motor road vehicle provided with an electric projector or search-light which is characterized mainly by the fact that upon the ordinary vehicle chassis there is pivoted a track formed of longitudinal members and stays which receive a carriage carrying the electric projector, this track being adapted to be raised and lowered by means of screw gear so that the carriage carrying the projector can readily be lowered from the vehicle; the vehicle also comprises a dynamo supplying the projector and driven by the engine of the vehicle through a clutch. In this manner a search-light equipment fulfilling all practical requirements is provided; in particular the projector can be transported very rapidly by means of the vehicle and when removed therefrom, it can readily be placed on precipitous ground or where but little space is available; the arrangement also renders it possible to supply the projector very readily with electric current and to effect the necessary maneuvers very rapidly.

Figure 8:
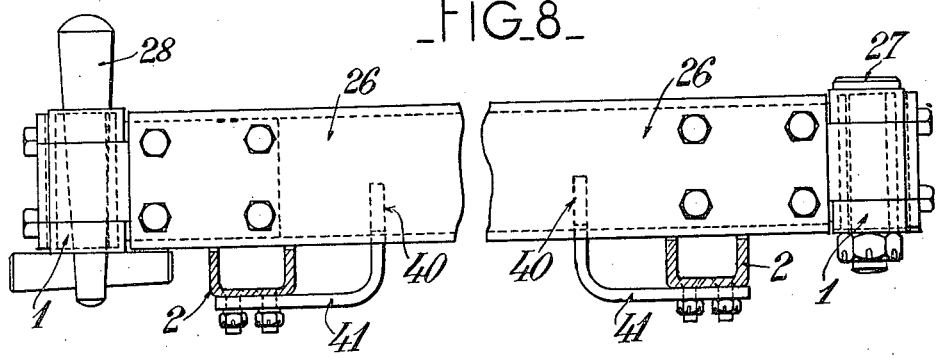
Figure 9:
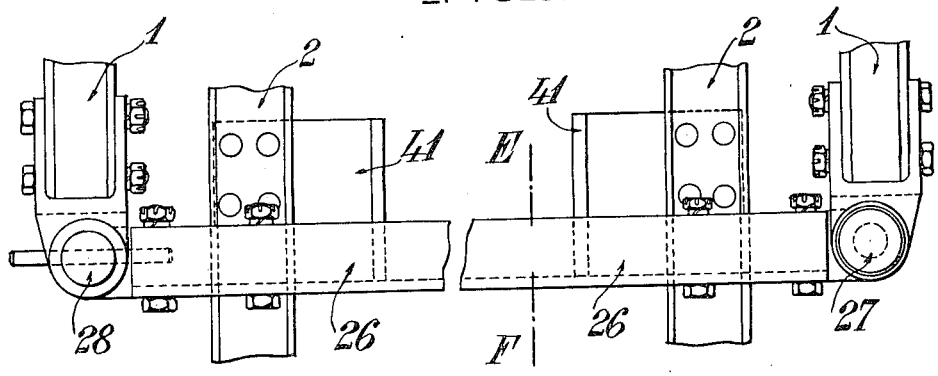
Figure 10:
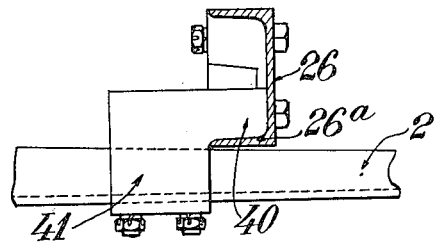

An embodiment of the invention is illustrated by way of example in the accompanying drawing, in which:

Figure 1 is an elevation of the chassis of a motor road vehicle with electric projector embodying the invention. Fig. 2 is a corresponding plan. Fig. 3 is a vertical cross section. Fig. 4 is an end elevation of the gear box through which the dynamo is driven. Fig. 5 is a vertical longitudinal section on the line A—B of Fig. 4. Fig. 6 is a horizontal section on the line C—D, Fig. 4, Fig. 7 is an elevation and partial section of the pivoted bracket for the dynamo, Fig. 8 is an end elevation of the rear transverse member of the chassis, Fig. 9 is a plan thereof, Fig. 10 is a vertical section on the line E—F, Fig. 9, Figs. 11 and 12 are two vertical sections at right angles to each other of the screw for raising the pivoted track. Fig. 13 is a vertical longitudinal section on the line G—H in Fig. 14 of the winch for operating the projector. Fig. 14 is a vertical cross-section thereof, and Fig. 15 is a vertical longitudinal section on the line K—L in Fig. 14.

Upon an ordinary chassis 1 there is mounted at the rear a pivoted track formed of two longitudinal members 2 raised in front and united at the front by a transverse member 3 and toward the rear by a crosspiece 4. This track as a whole is able to rotate about a pivot 5 rigid with the chassis. The rocking of this pivoted track is effected by means of lifting gear constituted by a screw 6 (Figs. 11 and 12) which is supported by one of the longitudinal members of the chassis 1 and which can be rotated by means of a handwheel 7, this screw 6 displaces a nut 8 carrying two rods 9 pivoted at 10 to the cross-piece 4 of the pivoted track. At its upper part the screw 6 is supported by a bearing 11 rigid with a casing 12 bolted to one of the longitudinal members 1 of the vehicle chassis.

The electric projector 14 is mounted upon a carriage 15 provided with wheels 16 which run in channel irons forming the longitudinal members 2 of the pivoted track. The carriage 15 can be hoisted upon the track 2 by means of a cable 17 wound upon a winch 19. This winch is rigidly connected with a sleeve 18ª (Fig. 13) upon which is keyed a worm wheel 18 and which rotates upon the pivot 5. The worm wheel 18 meshes with a worm 20 keyed upon a shaft 21 (Fig. 14) which carries a worm wheel 22 meshing with a worm integral with a hand lever 24. When the cable 17 leaves the drum 19 it passes over a dirigible guide pulley 25 and passes back to the carriage of the projector, to which it is attached. This arrangement has the advantage that the cable and the track are maintained parallel, so that the tractional effort of the winch is exerted to the best advantage.

To enable the projector to be removed from the vehicle chassis at the rear, the rear cross member 26 of this chassis is pivoted to one of the longitudinal members 1 on a vertical trunnion 27 (Figs. 2, 8 and 9) and fixed to the other by a vertical key 28. It is therefore only necessary to remove the key 28 to permit of swinging out the cross member 26. When it is again closed, the cross member engages by its lower branch 26ª, beneath a projection 40 of a bent member 41 bolted to the channel iron 2 of the pivoted frame which receives the wheels 16 of the carriage supporting the projector.

The vehicle chassis carries a dynamo 29 for supplying the projector with current and also a drum upon which the line wire connecting the two apparatus is wound.

The dynamo 29 is mounted upon a bracket 31 (Fig. 7) pivoted at 32 upon one of the longitudinal members 1 of the chassis and provided at its other end with a socket 31ª which can be fixed in place by means of two nuts 35 which are screwed upon a screw 34 pivoted to a support 33 fixed upon the other longitudinal member 1 of the vehicle. The dynamo 29 is driven through a chain 37 inclosed in an oil-tight casing 30 (Fig. 3). The mounting of the dynamo upon the oscillating bracket 31 enables the tension of this chain to be readily regulated. The chain 37 is driven by a pinion 50 (Fig. 6) keyed upon a shaft 49 carrying a pinion 48. The pinion is driven by the engine of the vehicle in the following manner: The shaft 51 (Figs. 4 and 5) coming from the engine drives the pinion 42 of the change speed gear box which meshes with a pinion 43 keyed upon a shaft 44. A claw clutch 45 enables this shaft 44 to drive a shaft 46 to which is fitted a pinion 47 meshing with the pinion 48. With this arrangement it is possible to drive the dynamo from the engine of the vehicle whether the latter is running or stationary.

Normally the projector 14 with its carriage 15 is held in position upon the pivoted track, the longitudinal members of which are raised. The projector can thus be rapidly displaced with the motor vehicle to which it can be secured. It can be operated by throwing-in the dynamo 29 by means of the clutch 45. When it is impossible to bring the motor vehicle to the point at which it is desired to place the projector, the latter is lowered from the chassis, by opening the cross member 26, causing the longitudinal members 2 to rock by means of the screw 6 and allowing the carriage supporting the projector to descend slowly along the track 2. The projector can then be rapidly brought to the desired place while allowing the line wires connecting it with the dynamo to unwind. The clutch of the motor vehicle is taken out, and the clutch connecting the engine with the dynamo thrown in.

It will of course be understood that the invention is not limited to the constructional details that have been described and represented.

Having now described my invention, what I claim as new and desire to secure by Letters Patent is:

1. The combination with a motor road vehicle including a vehicle frame of a track pivoted to said frame; a carriage adapted to run on said track, an electric projector supported on said carriage, a winch, a dirigible guide pulley carried on the track, means for operating the winch, and a cable wound upon the winch, passing over the guide pulley, and connected to the carriage, substantially as described and for the purpose set forth.

2. The combination with a motor road vehicle including a vehicle frame, of a track pivoted to said frame and including longitudinal members, means for rocking said track about its pivot, a carriage adapted to run on said track, an electric projector supported on said carriage, a rear cross member pivoted at the back end of the vehicle frame and arranged to support the track in its normal position, substantially as described and for the purpose set forth.

3. The combination with a motor road vehicle including a vehicle frame of a track pivoted to said vehicle frame and including longitudinal members, a carriage adapted to run upon said longitudinal members, an electric projector supported on said carriage, a screw adapted to effect the working of the track, a casing supporting said screw and fixed to the vehicle frame, means for turning said screw, a nut upon the screw and means for connecting said nut to the track, substantially as described and for the purpose set forth.

4. The combination with a motor road vehicle including a vehicle frame of a track pivoted to said vehicle frame and including longitudinal members, means for rocking said track about its pivot, a carriage adapted to run upon said longitudinal members, an electric projector supported on said carriage, a rear cross member pivoted at the back end of the vehicle frame whereby the track may be supported in its normal position by said cross member, a winch mounted on the vehicle frame about the pivot of the track, a dirigible guide pulley carried at the front end of the track, an irreversible worm gear for operating the winch, and a cable wound upon the winch, passing over the guide pulley and connected to the carriage, substantially as described and for the purpose set forth.

In testimony whereof I have signed my name to this specification in the presence of two subscribing witnesses.

ISAAC KOECHLIN.

Witnesses:
 Louis Moses,
 Chas. P. Pressly.